United States Patent
Li

(10) Patent No.: US 12,538,286 B2
(45) Date of Patent: Jan. 27, 2026

(54) UNLICENSED FREQUENCY SPECTRUM, AND STORAGE MEDIUM

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 658 days.

(21) Appl. No.: 17/281,110

(22) PCT Filed: Oct. 24, 2018

(86) PCT No.: PCT/CN2018/111733
§ 371 (c)(1),
(2) Date: Mar. 29, 2021

(87) PCT Pub. No.: WO2020/082276
PCT Pub. Date: Apr. 30, 2020

(65) Prior Publication Data
US 2021/0345314 A1    Nov. 4, 2021

(51) Int. Cl.
*H04W 72/044*    (2023.01)
*H04B 7/06*    (2006.01)
(Continued)

(52) U.S. Cl.
CPC ........ *H04W 72/046* (2013.01); *H04B 7/0695* (2013.01); *H04L 1/1812* (2013.01);
(Continued)

(58) Field of Classification Search
CPC ..... H04B 7/0695; H04B 7/088; H04L 1/1812; H04W 16/14; H04W 72/046;
(Continued)

(56) References Cited

U.S. PATENT DOCUMENTS

| | | |
|---|---|---|
| 2016/0353467 A1 | 12/2016 | Nekovee |
| 2017/0238341 A1 | 8/2017 | Liu et al. |

(Continued)

FOREIGN PATENT DOCUMENTS

| | | |
|---|---|---|
| CN | 107809805 A | 3/2018 |
| CN | 107820259 A | 3/2018 |

(Continued)

OTHER PUBLICATIONS

Combined Chinese Office Action and Search Report issued Sep. 28, 2022, in corresponding Chinese Patent Application No. 201880001778.0 (with English Translation and English Translation of Category of Cited Documents), 13 pages.

(Continued)

*Primary Examiner* — Pao Sinkantarakorn
(74) *Attorney, Agent, or Firm* — Oblon, McClelland, Maier & Neustadt, L.L.P.

(57) ABSTRACT

Aspects of the disclosure can provide a method for channel detection on an unlicensed frequency spectrum that can include determining a channel detection mechanism corresponding to a target beam among n beams, where n is an integer greater than 1. The method can further include detecting, based on the channel detection mechanism corresponding to the target beam, whether a channel corresponding to the target beam is idle. Accordingly, provided is a solution for detecting a channel based on beams in a scenario of an unlicensed frequency spectrum, where channel detection mechanisms for channels corresponding to different beams can be independently determined, and the channels corresponding to respective channels can be separately subject to channel detection.

16 Claims, 4 Drawing Sheets

(51) Int. Cl.
*H04L 1/1812* (2023.01)
*H04W 16/14* (2009.01)
*H04W 72/56* (2023.01)
*H04W 74/0816* (2024.01)

(52) U.S. Cl.
CPC .......... *H04W 16/14* (2013.01); *H04W 72/56* (2023.01); *H04W 74/0816* (2013.01)

(58) Field of Classification Search
CPC ............... H04W 72/542; H04W 72/56; H04W 74/0808; H04W 74/0816
See application file for complete search history.

(56) References Cited

U.S. PATENT DOCUMENTS

| | | |
|---|---|---|
| 2018/0199310 A1 | 7/2018 | Islam et al. |
| 2018/0279284 A1 | 9/2018 | Wang et al. |
| 2018/0287686 A1 | 10/2018 | John Wilson et al. |
| 2019/0132882 A1* | 5/2019 | Li ........................ H04L 27/2605 |
| 2019/0230706 A1* | 7/2019 | Li ........................... H04B 7/088 |
| 2019/0373635 A1* | 12/2019 | Yang .................. H04W 74/0808 |
| 2019/0387412 A1* | 12/2019 | Kim ........................ H04B 7/088 |
| 2020/0053571 A1* | 2/2020 | Tsai .................. H04W 74/0808 |
| 2020/0100285 A1* | 3/2020 | Roy .................. H04W 74/0808 |
| 2021/0058967 A1* | 2/2021 | Oteri .................. H04W 74/0808 |
| 2021/0392683 A1* | 12/2021 | Awadin .................. H04B 7/088 |
| 2021/0410187 A1* | 12/2021 | Yang .................. H04W 74/0808 |

FOREIGN PATENT DOCUMENTS

| | | | |
|---|---|---|---|
| CN | 107820684 A | 3/2018 | |
| CN | 107835516 A | 3/2018 | |
| CN | 107888256 A | 4/2018 | |
| CN | 107889113 A | 4/2018 | |
| CN | 107919929 A | 4/2018 | |
| CN | 107949067 A | 4/2018 | |
| WO | WO 2017/107593 A1 | 6/2017 | |

OTHER PUBLICATIONS

International Search Report issued on Jun. 27, 2019 in PCT/CN2018/111733 filed on Oct. 24, 2018, 2 pages.
Combined Chinese Office Action and Search Report issued Jul. 12, 2023 in Chinese Patent Application No. 201880001778.0, 8 pages.
Samsung, "R1-1808768-Channel access procedures for NR-U", 3GPP TSG-RAN WG1 Meeting #94 Gothenburg, Sweden, Aug. 20-24, 2018, 6 pages.
ZTE, "R1-1810326 Discussion on Channel access mechanism for NR-U_final", 3GPP TSG RAN WG1 Meeting #94bis, Chengdu, China, Oct. 8-12, 2018, 6 pages.
ZTE, "R1-1808321 Discussion on Channel access mechanism for NR-U_final", 3GPP TSG RAN WG1 Meeting #94, Gothenburg, Sweden, Aug. 20-24, 2018, 6 pages.
Chinese Notification to Grant Patent Right for Invention issued on Oct. 27, 2023 in Chinese Patent Application No. 201880001778.0 (with English translation), 6 pages.
Qualcomm Incorporated, "Channel access procedures for NR unlicensed", 3GPP TSG RAN WG1 Meeting #94, R1-1809479, Gothenburg, Sweden, Aug. 20-24, 2018, pp. 1-10.
Zte, Sanechips, "Framework on potential solutions and techniques for NR-U", 3GPP TSG RAN WG1 Meeting #92, R1- 1801466, Athens, Greece, Feb. 26-Mar. 2, 2018, pp. 1-8.
ZTE, Sanechips, "Design of channel access mechanism for NR-U", 3GPP TSG RAN WG1 Meeting #92bis, R1-1803952, Sanya, China, Apr. 16-20, 2018, pp. 1-5.

* cited by examiner

Determining a channel detection mechanism corresponding to a target beam among n beams, wherein n is an integer greater than 1 — 201

Detecting, based on the channel detection mechanism corresponding to the target beam, whether a channel corresponding to the target beam is idle — 202

UNLICENSED FREQUENCY SPECTRUM, AND STORAGE MEDIUM

CROSS-REFERENCE TO RELATED APPLICATION

This application is a US national stage of international application No. PCT/CN2018/111 733, filed on Oct. 24, 2018, and entitled "METHOD AND APPARATUS FOR CHANNEL DETECTION ON UNLICENSED SPECTRUM, AND STORAGE MEDIUM", the disclosure of which is herein incorporated by reference in its entireties.

TECHNICAL FIELD

The present disclosure relates to the field of communications technologies, including to a method and apparatus for channel detection on an unlicensed frequency spectrum, and a storage medium.

BACKGROUND

In a long-term evolution (LTE) communication system, signals are omnidirectionally transmitted via an omnidirectional antenna when an unlicensed frequency spectrum is used. Therefore, channel detection prior to channel access is also based on the omnidirectional antenna.

SUMMARY

Embodiments of the present disclosure provide a method and apparatus for channel detection on an unlicensed frequency spectrum, and a storage medium, which can solve the problem of inaccurate channel detection results in different beam directions. The technical solutions are as follows.

According to a first aspect of the embodiments of the present disclosure, a method for channel detection on an unlicensed frequency spectrum is provided. The method can include determining a channel detection mechanism corresponding to a target beam among n beams, where n is an integer greater than 1, and detecting, based on the channel detection mechanism corresponding to the target beam, whether a channel corresponding to the target beam is idle.

According to a second aspect of the disclosure, an apparatus for channel detection on an unlicensed frequency spectrum is provided. The apparatus can include a processor, and a memory that is configured to store at least one instruction executable by the processor. The processor, when executing the at least one instruction, can determine a channel detection mechanism corresponding to a target beam among n beams, where n is an integer greater than 1, and detect, based on the channel detection mechanism corresponding to the target beam, whether a channel corresponding to the target beam is idle.

According to a third aspect of the disclosure, a non-transitory computer-readable storage medium storing at least one computer program is provided that, when executed by a processor, causes the processor to perform the method as defined in the first aspect.

It should be understood that both the above general description and the following detailed description are exemplary and explanatory only, and are in no way intended to limit the present disclosure.

BRIEF DESCRIPTION OF THE DRAWINGS

The accompanying drawings, which are incorporated in and constitute a part of the description, illustrate exemplary embodiments of the present disclosure and, together with the description thereof, serve to explain the principles of the present disclosure.

DETAILED DESCRIPTION

Figures 1, 2:
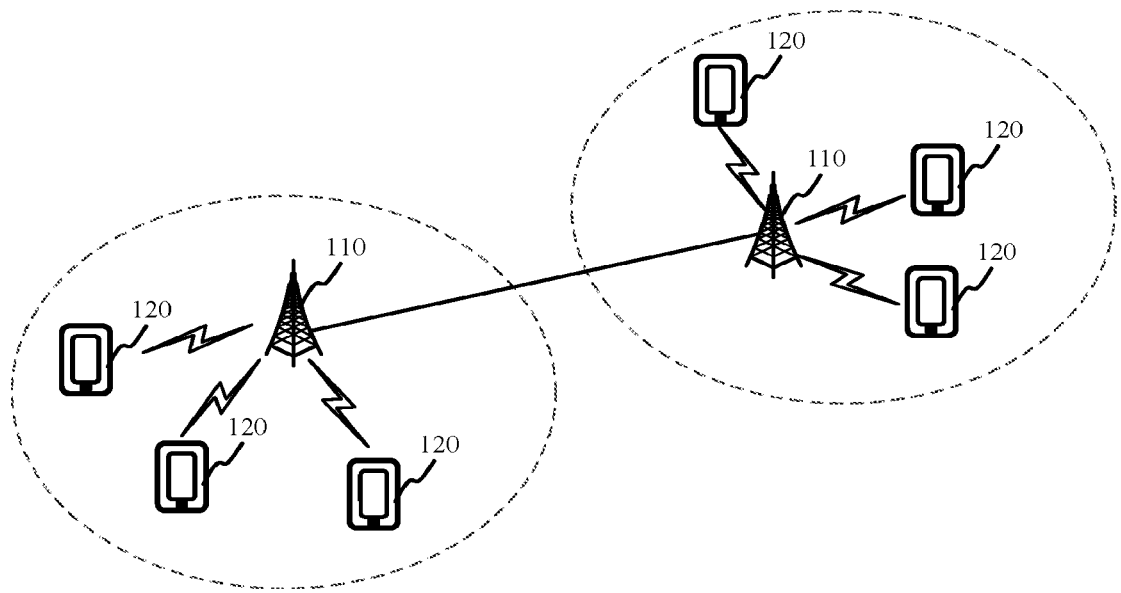
FIG. 1 illustrates a schematic diagram of a network architecture according to an exemplary embodiment.
FIG. 2 illustrates a flowchart of a method for channel detection on an unlicensed frequency spectrum according to an exemplary embodiment.

Reference is now made in detail to exemplary embodiments, examples of which are illustrated in the accompanying drawings.

A base station needs to first detect a received signal strength indicator (RSSI) around the base station before transmitting information on the unlicensed frequency spectrum. Because the RSSI is received based on the omnidirectional antenna, the RSSI is a sum of RSSIs that can be omnidirectionally received within a prescribed time granularity. Then, the sum of the RSSIs are compared with a threshold. If the sum of the RSSIs is greater than the threshold, the channel is occupied, and if the sum of the RSSIs is less than the threshold, the channel is idle.

In a 5G new radio (NR) system, an unlicensed frequency spectrum has a high frequency band. In order to increase the coverage, a base station and a terminal may transmit and receive signals over a plurality of beams having different orientations, i.e., beam-based transmission and reception. However, use situations of channels in different beam orientations are different. If the channel detection based on the omnidirectional antenna in the LTE system is still used, the problem of inaccurate detection results may be caused.

The technical solutions according to the embodiments of the present disclosure may have beneficial effects. For example, solution for channel detection based on beams in a scenario of an unlicensed frequency spectrum is provided, wherein channel detection mechanisms for channels corresponding to different beams are independently determined, and channel detection is carried out for the channels corresponding to respective channels, such that channel detection results are more accurate, which is more conductive to the transmitting and receiving based on the beams.

Where the following description discusses the accompanying drawings, unless otherwise specified, the same numbers in different drawings represent the same or similar elements. The embodiments set forth in the following description of exemplary embodiments do not represent all embodiments consistent with the present disclosure. Instead, the embodiments are merely examples of apparatuses and methods consistent with aspects related to the disclosure as recited in the appended claims. Prior to introduction and explanation of the embodiments of the present disclosure, a channel detection mechanism involved in the present disclosure is first interpreted.

The channel detection mechanism typically includes the following five categories.

The first category (Cat.1) does not involve listen before talk (LBT). That is, a device does not need to perform channel detection before transmitting information, but transmitting the information directly. The LBT may also be called as a collision avoidance mechanism and allows effective sharing of an unlicensed frequency spectrum. In an LBT mechanism, channel monitoring, that is, clear channel assessment (CCA) is required before information transmission, and then transmission is carried out over an idle channel.

The second category (LBT Cat.2) is an LBT mechanism without a random back-off process. A device only needs to detect one time granularity before transmitting information. For example, the time granularity may be 25 μs. If a channel is idle within this time granularity, the device may transmit information over this idle channel, or else, the LBT execution fails and the device may not transmit the information.

The third category (LBT Cat.3) is a random back-off type LBT mechanism with a fixed contention window size (CWS), wherein a transmitting device firstly detects whether a channel corresponding to a beam is idle within a first time granularity; if the channel corresponding to the beam is idle, a value N of a random number is selected in a first contention window, and the channel detection is performed with a second time granularity as the time granularity; if the channel corresponding to the beam is idle within the second time granularity, and the value of the random number is not 0, the value of the random number is reduced by 1, and the channel detection is continued with the second time granularity as the time granularity; if the channel corresponding to the beam is detected to be busy within the second time granularity, the channel detection is performed again with the first time granularity as the time granularity; if the channel corresponding to the beam is idle again within the first time granularity, and the value of the random number is not 0, the value of the random number is reduced by 1, and the channel detection is performed by restoring the second time granularity as the time granularity; and this process proceeds till the value of the random number is reduced to 0, which indicates that the channel is idle.

The fourth category (LBT Cat.4) is a random back-off type LBT mechanism with a variable CWS. That is, based on LBT Cat.3, the transmitting device may adjust the CWS based on a previous transmission result. For instance, in the case where the proportion of incorrectly received data is X among the data transmitted within a reference time during the previous transmission, a CWS value increases when X is greater than a threshold. In order to refine the parameter setting in the LBT process, four priorities are set in the LBT Cat.4, wherein each priority corresponds to a different parameter configuration, and the data transmissions of different service types correspond to different priorities.

The principle of the LBT Cat.4 is as follows: a device first detects whether a channel corresponding to the beam is idle within a first time granularity. If the channel corresponding to the beam is idle, a value N of a random number is selected in a first contention window, and the channel detection is performed with a second time granularity as the time granularity. If the channel corresponding to the beam is idle within the second time granularity, and the value of the random number is not 0, the value of the random number is reduced by 1, and the channel detection is continued with the second time granularity as the time granularity. If the channel corresponding to the beam is detected to be busy within the second time granularity, the channel detection is performed again with the first time granularity as the time granularity. If the channel corresponding to the beam is idle again within the first time granularity, and the value of the random number is not 0, the value of the random number is reduced by 1, and the channel detection is performed by restoring the second time granularity as the time granularity. This process proceeds till the value of the random number is reduced to 0, which indicates that the channel is idle.

For example, in the case where the first time granularity is 16 μs+M*9 μs, and the second time granularity is 9 μs, whether the channel is idle is first detected within 16 μs+M*9 μs. If the channel is idle, a value N of the random number is selected in a contention window, and then the detection is performed with 9 μs as the granularity. If the channel is idle, N−1 is used, and the detection is continued with 9 μs as the granularity. Else, the channel detection is performed with 16 μs+M*9 μs as the granularity. When the channel is idle, N−1 is used, and the detection is performed by restoring 9 μs as the granularity. This process proceeds till the random value is 0, which indicates that the channel is idle and usable.

The value of M is determined by $m_p$ in Table 1 and Table 2, and varies with different priorities p of channel access. Table 1 shows the parameter configurations of four priorities of the downlink LBT Cat.4, and Table 2 shows the parameter configurations of four priorities of the uplink LBT Cat.4. The two parameter configurations are only slightly different in configured values.

TABLE 1

| Priority of channel access (p) | $m_p$ | $CW_{min,p}$ | $CW_{max,p}$ | $T_{mcot,p}$ | Optional values of $CW_p$ |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

TABLE 2

| Priority of channel access (p) | $m_p$ | $CW_{min,p}$ | $CW_{max,p}$ | $T_{mcot,p}$ | Optional values of $CW_p$ |
|---|---|---|---|---|---|
| 1 | 2 | 3 | 7 | 2 ms | {3, 7} |
| 2 | 2 | 7 | 15 | 3 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

Among the four priorities of channel access shown in Table 1 and Table 2, the smaller the value p, the higher the corresponding priority. $m_p$ represents the number of extended clear channel assessments (ECCAs) included in one delay time, wherein each delay time consists of a fixed time duration of 16 μs and $m_p$ ECCAs, namely, the first time granularity described above. $CW_{min,p}$ and $CW_{max,p}$ represent a minimum contention window value and a maximum contention window value, wherein the CWS in the LBT process is generated between these two values, and then, a back-off counter N, that is randomly generated from 0 to the generated contention window $CW_p$, determines the length of a back-off time in the LBT channel detection process. $T_{mcot,p}$ represents a maximum time duration for occupying a channel after the LBT Cat.4 corresponding to each priority is executed successfully. From the above table, it can be known that compared with the priorities 1 and 2, channel access with the priorities 3 and 4 have a longer time for executing the LBT process, and the chance of acquiring channel access is relatively low. In order to ensure fairness, the maximum transmission time that may be occupied by data transmission using these two priorities is also relatively long.

The fifth category is a channel detection mechanism based on a frame structure, namely frame-based equipment (FBE). For FBE, a period is configured, and one channel detection is performed at a fixed position in each period. For example, the CCA detection is performed within each CCA detection time. If the channel is idle, the channel may be occupied for transmission, the maximum time duration for occupying the channel is fixed, and the CCA detection performed again when the CCA detection time of the next period is reached. If the channel is non-idle, a device may not occupy the channel in the current period, and the detection is not continued until the fixed position in the next period. A fixed period refers to a time domain unit of FBE scheduling. For example, the fixed period may be a fixed frame period (FFP). The time duration of the fixed period may be predetermined by a protocol.

It should be noted that the above five categories of channel detection mechanisms are only described for an exemplary purpose. With the evolution of communication technologies, the above five channel detection mechanisms may somewhat change, or new channel detection mechanisms may arise. Nevertheless, these mechanisms are all applicable to the technical solutions described in the present disclosure.

Network architectures and service scenarios described in the embodiments of the present disclosure are intended for more clearly explaining the technical solutions of the embodiments of the present disclosure, but not serve to limit the technical solutions according to the embodiments of the present disclosure. Those of ordinary skills in the art would know that with the evolution of the network architectures and the emergence of new service scenarios, the technical solutions according to the embodiments of the present disclosure are equally applicable to similar technical problems.

FIG. 1 illustrates a schematic diagram of a network architecture according to an exemplary embodiment. The network architecture may include a base station 110 and a terminal 120.

The base station 110 is deployed in an access network. The access network in a 5G NR system may be referred to as a new generation-radio access network (NG-RAN). The base station 110 and the terminal 120 communicate with each other based on an air interface technology, for example, a cellular technology.

The base station 110 is a device deployed in the access network for providing a wireless communication function for the terminal. The base station 110 may include various forms of macro base stations, micro base stations, relay stations, access points, and the like. In systems using different wireless access technologies, the names of devices having the functions of a base station may be somewhat different. For example, these devices are referenced to as gNodeB or gNB in the 5G NR system. As the 120 is typically more than one, and one or more terminals 120 may be distributed in a cell managed by each base station 110. The terminal 120 may include various types of wireless-communication-enabled handheld devices, vehicle-mounted devices, wearable devices, computing devices or other processing devices connected to wireless modems, as well as various forms of user equipment (UE), mobile stations (MSs), terminal devices, and the like. For the convenience of description, the above-mentioned devices are collectively referred to as terminals in the embodiments of the present disclosure.

The "5G NR system" in the embodiments of the present disclosure may also be referred to as a 5G system or an NR system, the meaning of which, however, can be understood by those skilled in the art. The technical solutions described in the embodiments of the present disclosure may be applicable to the 5G NR system, and may be also applicable to subsequent evolution systems of the 5G NR system.

FIG. 2 illustrates a flowchart of a method for channel detection on an unlicensed frequency spectrum according to an exemplary embodiment. In this embodiment, an execution subject of the method may be the base station 110 or the terminal 120 in the network architecture illustrated in FIG. 1. For the convenience of description, unless otherwise specified, each process is described and explained with a "device" as the execution subject in the following method embodiments. The method may include the following processes.

In step 201, a channel detection mechanism corresponding to a target beam among n beams can be determined, wherein n is an integer greater than 1. In the 5G NR system, in order to improve the transmission quality of wireless signals, a beamforming technology is introduced to realize directional information transmission or reception, i.e., beam-based transmission or reception. The base station may include a plurality of antennas, which may generate a plurality of beams with different orientations to cover a cell served by the base station. The base station may directionally transmit information to a terminal in the cell over the beam, and may also directionally receive information transmitted by a terminal in the cell over the beam. A beam for transmitting information may be referred to as a transmit beam, and a beam for receiving information may be referred to as a receive beam. Similarly, the terminal may also transmit information to or receive information from the base station over the beam in a similar way.

Before transmitting information over a channel corresponding to a target beam on an unlicensed frequency spectrum, a device may first detect whether the channel corresponding to the target beam is idle, and may transmit the information over the channel when the channel is idle. The target beam may be any one of the n beams. The target beam may be a target transmit beam. This is because, before transmitting information, a device needs to detect whether a channel corresponding to the transmit beam is idle. Moreover, before channel detection on a channel, the device needs to monitor the channel for the strength of signals from other devices, by the receive beam corresponding to the transmit beam. Therefore, detecting whether the channel corresponding to the target beam is idle is mainly to detect whether the channel corresponding to the target transmit beam is idle, wherein the receive beam corresponding to the target transmit beam is configured to perform LBT detection on the channel.

In an exemplary embodiment, a device determines, based on information to be transmitted over the channel corresponding to the target beam, the channel detection mechanism corresponding to the target beam.

When the device is a base station, if the information to be transmitted is a synchronization signal block (SSB) or a reference signal (RS), the base station may determine that the channel detection mechanism corresponding to the target beam is Cat.1 or LBT Cat.2. If the information to be transmitted is downlink control information (DCI) or downlink service data, that is, when a physical downlink control channel (PDCCH) or a physical downlink shared channel (PDSCH) is to be occupied for information transmission, the base station may determine that the channel detection mechanism corresponding to the target beam is the LBT Cat.3, LBT Cat.4, or FBE mechanism.

In addition, even though all of those to be transmitted are downlink service data to be transmitted over the PDSCH, and the quality of service (QoS), such as a delay requirement, a transmission rate requirement, or the like, of the information to be transmitted is different, the channel detection may be performed by using LBT Cat.4. different priorities may be configured based on the information having different QoS requirements, and meanwhile, other different specific parameters, such as the magnitudes of $m_p$, $CW_{min,p}$, $CW_{max,p}$, $T_{mcot,P}$ and $CW_p$. Among the four priorities, the smaller the p value, the higher the corresponding priority and the stricter the delay requirement. That is, the smaller the parameter value in Table 1, the easier the detection of an idle channel.

When the device is a terminal, if the terminal sends a random-access request to the base station, that is, when a physical random-access channel (PRACH) needs to be occupied for information transmission, the terminal may determine that the channel detection mechanism corresponding to the target beam is Cat.1 or LBT Cat.2. If the information required to be transmitted is uplink control information (UCI) or uplink service data, that is, when a physical uplink control channel (PUCCH) or a physical uplink shared channel (PUSCH) is needed to be occupied for information transmission, the terminal may determine that the channel detection mechanism corresponding to the target beam is the LBT Cat.3, LBT Cat.4, or FBE mechanism.

It should be noted that after the base station transmits resource scheduling information to the terminal in the downlink, the terminal is scheduled to use the PUCCH or PUSCH for uplink transmission; and when a time interval between the downlink transmission and the uplink transmission is small, the terminal may also use LBT Cat.2 for channel detection during uplink transmission.

The detection parameters corresponding to the channel detection mechanism can be configured by configuring different channel detection mechanism for different transmission information, thereby improving the accuracy and detection efficiency in channel detection.

In step 202, whether a channel corresponding to the target beam is idle is detected based on the channel detection mechanism corresponding to the target beam. The device detects, based on the channel detection mechanism corresponding to the target beam, whether a channel corresponding to the target beam is idle. In response to detecting that the target beam corresponds to an idle channel, the device may transmit information over the channel corresponding to the target beam. If the device is a base station, the base station, in response to detecting that the channel corresponding to the target beam is idle, may transmit information such as SSB, RS, DCI, or downlink service data to the terminal over the channel. If the device is a terminal, the terminal, in response to detecting the channel corresponding to the target beam is idle, may transmit information such as a random-access request, an UCI or uplink service data to the base station.

In addition, because the device has n beams, the device may: determine a channel detection sequence corresponding to the n beams; and then detect, based on the channel detection sequence corresponding to the n beams, whether channels corresponding to the n beams are idle one by one, wherein a beam requiring channel detection among the n beams is the target beam. For example, in the case where the device has 4 beams including a beam 1, a beam 2, a beam 3, and a beam 4, it is assumed that a channel detection sequence corresponding to these 4 beams is the beam 3, the beam 2, the beam 4, and the beam 1; and the device may first detect whether the channel corresponding to the beam 3 is idle, detect whether the channel corresponding to the beam 2 is idle, then detect whether the channel corresponding to the beam 4 is idle, and finally detect whether the channel corresponding to the beam 1 is idle. The number of beams that can be simultaneously transmitted by the device is limited. For example, the number of beams that can be transmitted simultaneously is m, where m is greater than or equal to 1. If channels corresponding to a plurality of beams, for example, n need to be detected, and when m is less than n, the channel detection sequence corresponding to the plurality of beams needs to be determined by the above method. Therefore, the device may perform sequential detection based on the determined channel detection sequence to ensure that the channel detection is preferentially performed for the beam transmitted first, such that the process of detecting the channels corresponding to the plurality of beams by the device is more standardized and more reasonable.

Optionally, determining the channel detection sequence corresponding to the n beams includes determining, based on a priority of information to be transmitted over a channel corresponding to each of the n beams, the channel detection sequence corresponding to the n beams.

When the device is a base station, the order of priorities of information to be transmitted may be as follows: SSB ranking the highest, followed by RS, and then DCI and downlink service data, wherein the priorities of DCI and downlink service data may be the same. If all the information to be transmitted is the downlink service data, the ranking is performed with reference to their service types. For example, the ranking is made according to the principle that the higher the transmission delay requirement of the information to be transmitted, the higher the priority of the channel to be detected.

As an example, in the case where the information to be transmitted by a terminal 1 within a service range of the beam 1 and the information to be transmitted by a terminal 2 within a service range of the beam 2 are both service data, and the terminal 1 has a service, such as real-time voice, delay requirement higher than a service, such as audio and video, delay requirement of the terminal 2, the channel detection corresponding to the beam 1 is performed before the channel detection corresponding to the beam 2.

When the device is a terminal, the order of priorities of information to be transmitted may be as follows the random-access request ranking the highest, followed by RS, and then UCI and uplink service data, wherein the priorities of DCI and downlink service data may be the same.

The channel detection sequence corresponding to the plurality of beams is determined based on the priority of information to be transmitted over a channel corresponding to each beam. When the device has a plurality of information to be transmitted, a channel for transmitting information having a high transmission delay requirement may be preferentially detected, thereby increasing the transmission efficiency and improving the throughput of a communication system.

In response to detecting that the channel corresponding to the target beam is non-idle, the device continues with the detection until the channel corresponding to the target beam is idle, and then start to detect a channel corresponding to a next target beam. For example, the channel detection corresponding to the beam 1 is prior to the channel detection corresponding to the beam 2; when a channel corresponding to the beam 1 is non-idle, the device may not transmit information using the channel corresponding to the beam 1, and need to continue with the channel detection; and when the channel corresponding to beam 1 is idle at a certain time, the device may occupy the channel for information transmission, and start to detect a channel corresponding to the beam 2 upon completion of the information transmission. However, when a channel corresponding to a target beam keeps non-idle for a long time, the detection of a channel corresponding to another beam may not be started either, and information may not be transmitted even though the channel corresponding to another beam is idle.

In order to avoid the situation where a channel corresponding to another beam fails to transmit information since a channel corresponding to a beam keeps non-idle for a long time, a device may also determine a channel detection time requirement corresponding to the target beam, wherein the channel detection time requirement include one or a combination of: a detection start time, a detection time duration, a detection end time; and in a time period meeting the channel detection time requirement, the device detects, based on the channel detection mechanism corresponding to the target beam, whether the channel corresponding to the target beam is idle.

The channel detection time duration is a preset time duration, and a detection time duration corresponding to the target beam refers to a maximum time for performing the channel detection on the channel corresponding to the target beam. In this case, the device may determine a channel detection time corresponding to the target beam based on the detection time duration corresponding to the target beam. The device may detect, within the channel detection time, whether the channel corresponding to the target beam is idle, stop detecting the channel corresponding to the target beam when the detection time duration is exceeded, and detect a channel corresponding to another beam. For instance, in the case where the channel detection mechanism is LBT Cat.3 or LBT Cat.4, if a channel corresponding to the beam 1 is detected for a long time and N cannot be reduced to 0, the detection of the channel corresponding to the beam 1 should be stopped when the detection time duration reaches the maximum time duration, and the detection of the channel corresponding to another beam should be started. Or else, the channels corresponding to all the beams may not be available. However, when the detection of the channel corresponding to the beam 1 is stopped and the detection of other beams is started, the channel corresponding to another beam may be idle, and then, the channel corresponding to another beam may be preferentially occupied for information transmission.

Further, when the channel detection time requirement includes the detection start time and the detection end time, a detection end time corresponding to a previous beam in this case may not exceed a detection start time corresponding to a next beam. For example, in the case where the channel detection for the beam 1 is performed before that for the beam 2, it is assumed that for a communication system with a subcarrier spacing of 15 kHz, a detection start time of the beam 2 is a symbol numbered 3 among 14 symbols of a subframe, and the channel detection for the beam 1 needs to be ended before the symbol numbered 3.

In addition, when the information to be transmitted is an SSB, because the SSB has a fixed transmission time, a detection end time of the channel detection performed before the transmission of an SSB may not exceed the transmission time of the SSB.

As an example, if the base station is to transmit an SSB over a beam, it is assumed that for a communication system with a subcarrier spacing of 15 kHz, a transmit position of SSB #0 is a symbol numbered 2-5 and a transmit position of SSB #1 is a symbol numbered 8-11, among 14 symbols of a subframe; and before transmission of SSB #0, the channel detection needs to be started before the symbol numbered 2, and before transmission of SSB #1, the channel detection needs to be started before the symbol numbered 8.

By limiting the detection start time, the detection time duration, or the detection end time of the channel detection corresponding to the beam, the device, in response to detecting that a channel corresponding to a certain beam is non-idle for a long time, may detect whether channels corresponding to beams are idle. When a channel corresponding to another beam is idle, the device may transmit information on this idle channel, thereby avoiding the situation where a channel corresponding to another beam fails to transmit information since a channel corresponding to a beam keeps non-idle for a long time. Optionally, a channel detection energy threshold corresponding to each of the n beams is independently determined separately.

The channel detection energy may be an RSSI, and the channel detection energy threshold is an RSSI threshold. The channel detection energy threshold corresponding to each of the n beams may be independently determined separately without mutual interferences.

When the device is a base station, the base station may determine by itself a channel detection energy threshold corresponding to each of the n beams.

When the device is a terminal, the terminal may receive a channel detection energy threshold corresponding to each of the n beams indicated by the base station, and may also include the channel detection energy threshold in the channel detection indication information.

Optionally, when the channel detection mechanism corresponding to the target beam is an LBT Cat.4 mechanism, the proportion of a hybrid automatic repeat request non-acknowledgment (HARQ-NACK) value corresponding to the target beam is determined, and a CWS value corresponding to the target beam is updated based on the proportion of the HARQ-NACK value corresponding to the target beam. The proportion of the HARQ-NACK value here may be the value of a proportion at which data transmitted by a transmitting terminal is feedback as an NACK by a receiving terminal within a reference time, and the device may update the CWS value corresponding to the target beam based on a magnitude relation between this proportion value and a preset threshold.

In LBT Cat.4, the CWS is determined by the priority p of channel access in LBT Cat.4. An optional CWS value varies with different priorities of channel access. Referring to Table 1 and Table 2, each priority has a $CW_{max,p}$ and a $CW_{min,p}$, and corresponds to a plurality of parameters of optional $CW_p$ values. A contention window can be determined from the plurality of optional $CW_p$ values, and the value of $CW_{min,p}$ is used a channel is initially accessed. The CWS is adjustable. For example, the device detects a channel to be idle during the first channel detection, and to the end of $T_{mcot,p}$, the device may determine the CWS during the second channel detection based on a receiving error rate of data transmission within a reference time, i.e., the proportion at which the data is feedback as an HARQ-NACK value by the receiving terminal. If the proportion of the HARQ-NACK value is equal to or greater than the preset threshold, the CWS value needs to be increased, or else the original CWS value remains unchanged. When the CWS value increases to $CW_{max,p}$ and the $CW_{max,p}$ is maintained for a preset number of times, the CWS value is reset to $CW_{min,p}$. The reference time may be one of specific subframes within a time during which a channel is occupied for the first time, and may be specified by the protocol, and the preset threshold and the preset number of times may be specified by the protocol or determined by the device itself As an example, it is assumed that LBT Cat.4 is used for channel detection in a downlink transmission process, and specific parameters corresponding to a priority 1, i.e., $CW_{max,p}$=p7, $CW_{min,p}$=3 and $T_{mcot,p}$=2 ms, are used. A reference may be made to Table 1. The CWS for the base station to perform channel detection is 3 when a channel is initially accessed, and the channel is idle; and 2 ms later, the base station determines a CWS during second channel detection, based on a proportion of the HARQ-NACK value feedback in a specific subframe within 2 ms. Assuming that the proportion of the HARQ-NACK value is equal to or greater than 80%, the CWS needs to be increased. The CWS is increased to 7, i.e., $CW_{max,p}$, based on the optional values of $CW_p$. Assuming that by maintaining the CWS as 7 for 10 times, the CWS is reset to 3.

In summary, the technical solutions according to the embodiments of the present disclosure provide a beam-based channel detection solution in an unlicensed frequency spectrum scenario, where channel detection mechanisms are independently determined separately for channels corresponding to different beams, and the channel detection is separately performed on the channel corresponding to each beam, such that a channel detection result is more accurate, which is more beneficial to the beam-based transmitting and receiving.

In another aspect, the channel detection sequence corresponding to the plurality of beams is determined based on the priority of information to be transmitted over a channel corresponding to each beam. When the device has a plurality of information to be transmitted, a channel for transmitting information having a high transmission delay requirement may be preferentially detected, thereby increasing the transmission efficiency and improving the throughput of a communication system.

In yet another aspect, by limiting the detection start time, detection time duration, or detection end time of the channel detection corresponding to the beam, the device, in response to detecting that a channel corresponding to a certain beam is non-idle for a long time, may detect whether channels corresponding to other beams are idle. When a channel corresponding to another beam is idle, the device may transmit information on this idle channel, thereby avoiding the situation where a channel corresponding to another beam fails to transmit information since a channel corresponding to a beam keeps non-idle for a long time.

The method according to the above embodiment illustrated in FIG. 2 is applicable to both the base station and the terminal. When the device is a terminal, the terminal may also determine a target beam for channel detection in the following fashion.

In an exemplary embodiment, the terminal receives channel detection indication information from the base station, and determines a target beam for channel detection based on the channel detection indication information.

The channel detection indication information indicates whether the channel corresponding to the target beam is idle. The channel detection indication information may include the identification information of the target beam. The target beam indicated by the base station is the target transmit beam, that is, the terminal needs to use the target transmit beam for uplink transmission. Then, the terminal needs to detect whether a channel corresponding to the target transmit beam is idle. In response to detecting whether the channel is idle, the terminal needs to monitor the channel for the strength of signals transmitted by other devices by using a receive beam corresponding to the target transmit beam, and judge, based on a comparison result between the strength of signals and a threshold value, whether the channel is idle.

Optionally, the channel detection indication information further includes a channel detection mechanism corresponding to the target beam. If the channel detection mechanism corresponding to the target beam is LBT Cat.4, the channel detection indication information may also include a p value, i.e., a priority of channel access.

The terminal determines a target beam in need of channel detection based on the received channel detection indication information, and then detects, based on the channel detection mechanism corresponding to the target beam, whether the channel corresponding to the target beam is idle.

In another exemplary embodiment, the terminal may also determine by itself a target beam on which the channel detection is to be performed. The terminal determines a receive beam recently used for receiving information as the target beam for channel detection; or the terminal determines a transmit beam recently used for transmitting information as the target beam for channel detection.

As an example, in response to recently receiving an SSB or a channel state information reference signal (CSI-RS), the terminal determines a receive beam used for receiving the above SSB or CSI-RS, as a target beam for channel detection.

As an example, in response to recently receiving a DCI or downlink service data, i.e., information transmitted over a PDCCH or PDSCH, from the base station, the terminal determines a receive beam used for receiving the DCI or downlink service data, as a target beam for channel detection.

As an example, in response to recently transmitting any one of a sounding reference signal (SRS), a UCI and uplink service data, that is, when information needs to be transmitted to the base station over a PUCCH or PUSCH, a transmit beam for transmitting the SRS, UCI or uplink service data is determined as a target beam for channel detection.

In response to determining the target beam for channel detection and the channel detection mechanism corresponding to the target beam, the terminal detects, based on the channel detection mechanism, whether a channel corresponding to the target beam is idle, and in response to detecting that the target beam corresponds to an idle channel, the terminal may transmit information over the channel corresponding to the target beam.

Figure 3:
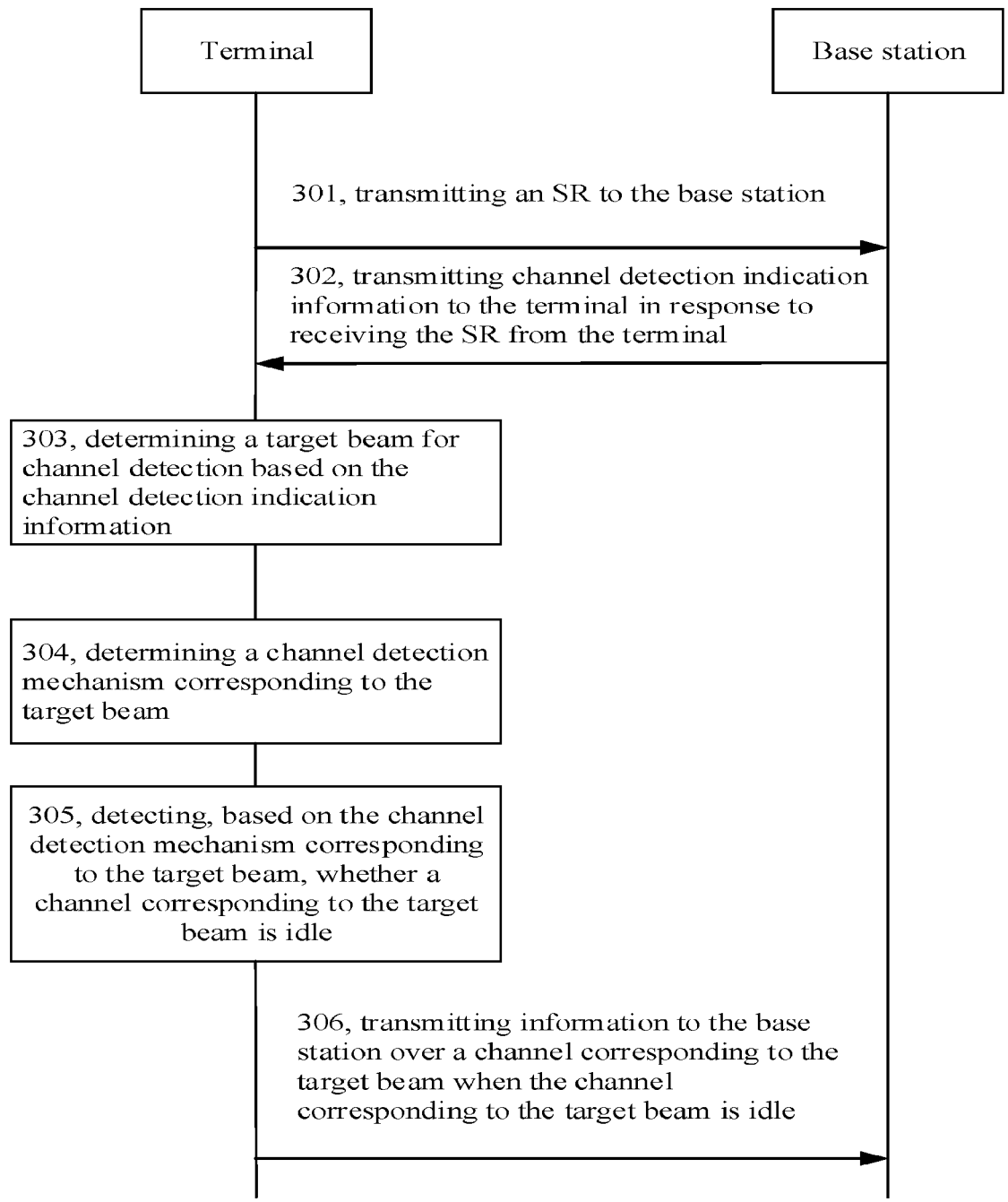
FIG. 3 illustrates a flowchart of a method for channel detection on an unlicensed frequency spectrum according to another exemplary embodiment.

Referring to FIG. 3, a flowchart of a method for channel detection on an unlicensed frequency spectrum according to another embodiment of the present disclosure is illustrated. In this embodiment, the method is mainly applicable to the network architecture illustrated in FIG. 1 for description and explanation. The method may include the following processes.

In step 301, a terminal transmits a scheduling request (SR) to a base station. Before transmitting information to the base station, the terminal transmits the SR to the base station to request the base station to allocate uplink resources for the terminal. If the SR is transmitted to the base station by licensed frequency spectrum, the terminal does not need to perform channel detection; and if the SR is transmitted to the base station by an unlicensed frequency spectrum, the terminal needs to perform the channel detection by using one of the above five categories of channel detection mechanisms, and transmits the SR when a channel is idle. As for the category of channel detection mechanism to be specifically used, no limitation is made.

In step 302, the base station sends channel detection indication information to the terminal in response to receiving the SR from the terminal. The channel detection indication information indicates whether the channel corresponding to the target beam is idle. The channel detection indication information may include the identification information of the target beam.

In some other exemplary embodiments, the channel detection indication information may further include one or a combination of information such as a channel detection mechanism, a p value, a detection start time, a detection time duration, a detection end time, and a channel detection energy threshold. Optionally, the terminal may determine one or more of the above information by itself In step 303, the terminal determines a target beam for channel detection based on the channel detection indication information.

In step 304, the terminal determines a channel detection mechanism corresponding to the target beam.

In step 305, the terminal detects, based on the channel detection mechanism corresponding to the target beam, whether a channel corresponding to the target beam is idle.

In step 306, the terminal transmits information to the base station over the channel corresponding to the target beam when the channel corresponding to the target beam is idle.

For details that are not described in the embodiment illustrated in FIG. 3, reference may be made to the above embodiment illustrated in FIG. 2.

In summary, the technical solutions according to the embodiments of the present disclosure provide a beam-based channel detection scheme in an unlicensed frequency spectrum scenario, wherein channel detection mechanisms are independently determined for channels corresponding to different beams, and the channel detection is performed on the channel corresponding to each beam, such that a channel detection result is more accurate, which is more conducive to the beam-based transmission and reception.

It should be noted that the technical solutions of the present disclosure are described only from the perspective of the interaction between the base station and the terminal in the above embodiment illustrated in FIG. 3. The above related processes performed by the base station can be separately implemented as a method for channel detection on an unlicensed frequency spectrum on a base station side. Further, the above related processes executed by the terminal can be separately implemented as a method for channel detection on an unlicensed frequency spectrum on a terminal side.

Described below are apparatus embodiments of the present disclosure, which may be used to implement the method embodiments of the present disclosure. For details not disclosed in the apparatus embodiments of the present disclosure, reference may be made to the method embodiments of the present disclosure.

Figure 4:
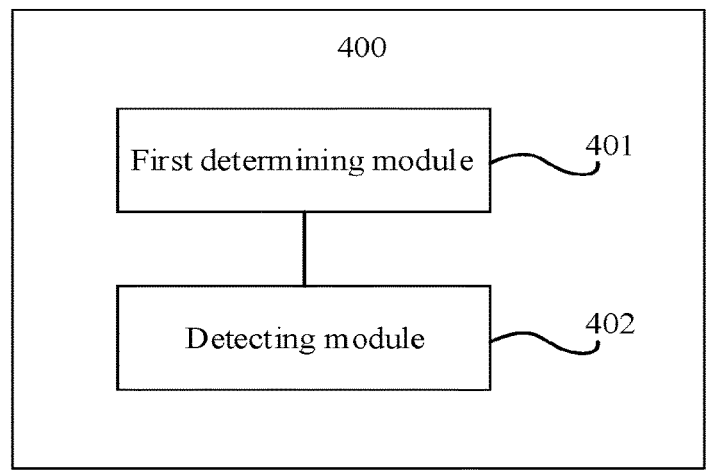
FIG. 4 illustrates a block diagram of an apparatus for channel detection on an unlicensed frequency spectrum according to an exemplary embodiment.

FIG. 4 illustrates a block diagram of an apparatus for channel detection on an unlicensed frequency spectrum according to an exemplary embodiment. The apparatus has the functions for implementing the method embodiments described above, and these functions may be implemented either by hardware or by hardware executing corresponding software. The apparatus is applicable to the base station or terminal as described above. As illustrated in FIG. 4, the apparatus 400 may include a first determining module 401 and a detecting module 402. Of course, it should be understood that one or more of the modules described in this specification The first determining module 401 is configured to determine a channel detection mechanism corresponding to a target beam among n beams, wherein n is an integer greater than 1.

The detecting module 402 is configured to detect, based on the channel detection mechanism corresponding to the target beam, whether a channel corresponding to the target beam is idle.

In summary, the technical solutions according to the exemplary embodiments of the present disclosure provide a beam-based channel detection scheme in an unlicensed frequency spectrum scenario, where channel detection mechanisms are independently determined for channels corresponding to different beams, and the channel detection is separately performed on the channel corresponding to each beam, such that a channel detection result is more accurate, which is more conducive to the beam-based transmission and reception.

In an optional embodiment based on the embodiment illustrated in FIG. 4, the first determining module 401 is configured to determine, based on information to be transmitted over the channel corresponding to the target beam, the channel detection mechanism corresponding to the target beam.

Figure 5:
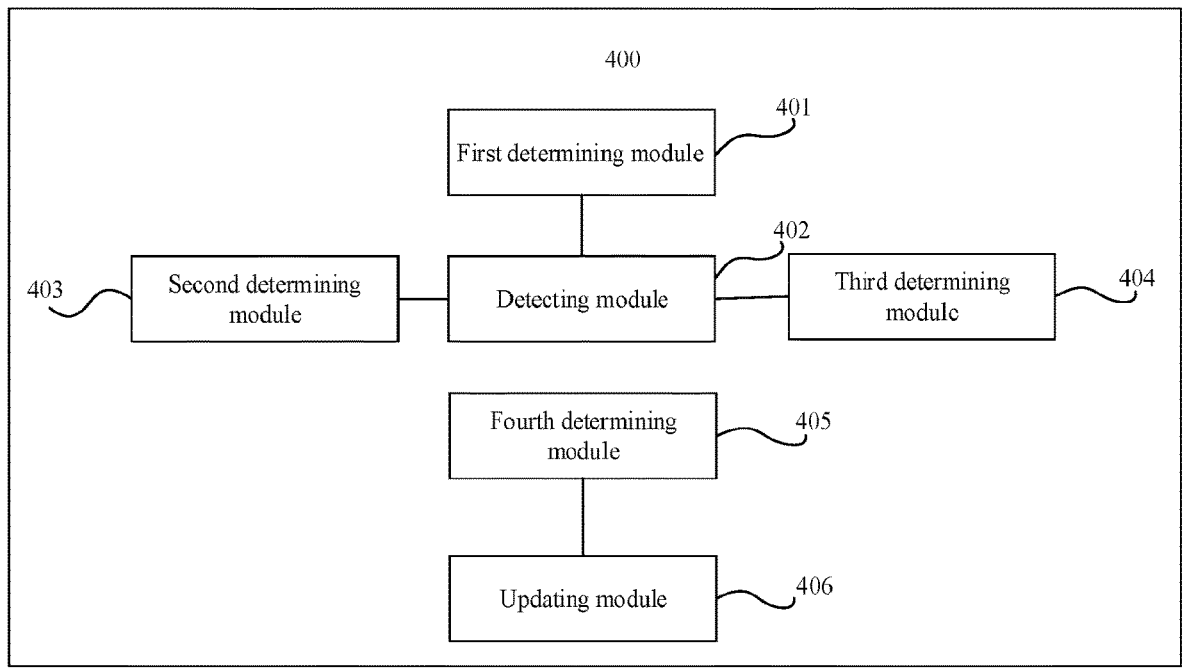
FIG. 5 illustrates a block diagram of an apparatus for channel detection on an unlicensed frequency spectrum according to another exemplary embodiment.

In another optional embodiment based on the embodiment illustrated in FIG. 4 or any one of the above optional embodiments, as illustrated in FIG. 5, the apparatus 400 further includes a second determining module 403.

The second determining module 403 is configured to determine a channel detection sequence corresponding to the n beams; and The detecting module 402 is further configured to detect, based on the channel detection sequence corresponding to the n beams, whether channels corresponding to the n beams are idle one by one, wherein a beam requiring channel detection among the n beams is the target beam. Optionally, the second determining module 403, configured to determine, based on a priority of information to be transmitted over a channel corresponding to each of the n beams, the channel detection sequence corresponding to the n beams.

In another optional embodiment based on the embodiment illustrated in FIG. 4 or any one of the above optional embodiments, as illustrated in FIG. 5, the apparatus 400 further includes a third determining module 404. The third determining module 404 is configured to determine a channel detection time requirement corresponding to the target beam, wherein the channel detection time requirement includes one or a combination of: a detection start time, a detection time duration, and a detection end time.

The detecting module 402 is further configured to, in a time period that meets the channel detection time requirement, detect, based on the channel detection mechanism corresponding to the target beam, whether the channel corresponding to the target beam is idle.

In another optional embodiment based on the embodiment illustrated in FIG. 4 or any one of the above optional embodiments, a channel detection energy threshold corresponding to each of the n beams is independently determined.

In another optional embodiment based on the embodiment illustrated in FIG. 4 or any one of the above optional embodiments, as illustrated in FIG. 5, the apparatus 400 further includes: a fourth determining module 405 and an updating module 406.

The fourth determining module 405 is configured to determine a proportion of an HARQ-NACK value corresponding to the target beam in response to determining that the channel detection mechanism corresponding to the target beam is an LBT Cat.4 mechanism. The updating module 406 is configured to update, based on the proportion of the HARQ-NACK value corresponding to the target beam, a CWS value corresponding to the target beam.

In another optional embodiment based on the embodiment illustrated in FIG. 4 or any one of the above optional embodiments, when the apparatus is applicable to a terminal, the apparatus further includes a receiving module (not illustrated in FIG. 4) and a fifth determining module (not illustrated in FIG. 4). The receiving module is configured to receive channel detection indication information from a base station, wherein the channel detection indication information indicates whether the channel corresponding to the target beam is idle. The fifth determining module is configured to determine, based on the channel detection indication information, the target beam requiring channel detection.

In another optional embodiment based on the embodiment illustrated in FIG. 4 or any one of the above optional embodiments, when the apparatus is applicable to a terminal, the apparatus further includes a fifth determining module. The fifth determining module is configured to determine a receive beam recently used for receiving information as the target beam for channel detection or determine a transmit beam recently used for transmitting information as the target beam for channel detection.

An exemplary embodiment of the present disclosure further provides an apparatus for channel detection on an unlicensed frequency spectrum. The apparatus is applicable to the base station or terminal as described above, and may implement the method for channel detection on an unlicensed frequency spectrum according to the present disclosure. The apparatus may include a processor, and a memory configured to store at least one instruction executable by the processor. The processor is configured to determine a channel detection mechanism corresponding to a target beam among n beams, wherein n is an integer greater than 1, and detect, based on the channel detection mechanism corresponding to the target beam, whether a channel corresponding to the target beam is idle.

Optionally, the processor is configured to determine, based on information to be transmitted over the channel corresponding to the target beam, the channel detection mechanism corresponding to the target beam. The processor can be further configured to determine a channel detection sequence corresponding to the n beams; and detect, based on the channel detection sequence corresponding to the n beams, whether channels corresponding to the n beams are idle one by one, wherein a beam requiring channel detection among the n beams is the target beam.

Optionally, the processor is configured to determine, based on a priority of information to be transmitted over a channel corresponding to each of the n beams, the channel detection sequence corresponding to the n beams. The processor can be further configured to determine a channel detection time requirement corresponding to the target beam, wherein the channel detection time requirement includes one or a combination of: a detection start time, a detection time duration, and a detection end time, and in a time period that meets the channel detection time requirement, detect, based on the channel detection mechanism corresponding to the target beam, whether the channel corresponding to the target beam is idle.

Optionally, a channel detection energy threshold corresponding to each of the n beams is independently determined.

Optionally, the processor is further configured to determine a proportion of an HARQ-NACK value corresponding to the target beam in response to determining that the channel detection mechanism corresponding to the target beam is an LBT Cat.4 mechanism, and update, based on the proportion of the HARQ-NACK value corresponding to the target beam, a CWS value corresponding to the target beam.

Optionally, when the apparatus is applicable to a terminal, the processor is further configured to: receive channel detection indication information from a base station, wherein the channel detection indication information indicates whether the channel corresponding to the target beam is idle, and determine the target beam requiring channel detection based on the channel detection indication information.

Optionally, when the apparatus is applicable to a terminal, the processor is further configured to determine a receive beam recently used for receiving information as the target beam for channel detection, or determine a transmit beam recently used for transmitting information as the target beam for channel detection.

An exemplary embodiment of the present disclosure further provides a system for channel detection on an unlicensed frequency spectrum. The system may include the base station and the terminal as described above.

Described above mainly introduces the solutions according to the embodiments of the present disclosure from the perspectives of the base station and the terminal. It should be understood that, in order to implement the functions above, the base station and terminal include corresponding hardware structures and/or software modules for executing the respective functions. The embodiments of the present disclosure may be implemented in the fashion of hardware or a combination of hardware and computer software in conjunction with the units as well as algorithms and processes of the examples described in the embodiments disclosed in the present disclosure. Whether a function is executed by hardware or computer software-driven hardware depends on the specific application of the technical solution and design constraints. Those skilled in the art may implement the described functions by using different methods for each specific application, but such implementation should not be construed as going beyond the scope of the technical solutions of the embodiments of the present disclosure.

Figure 6:
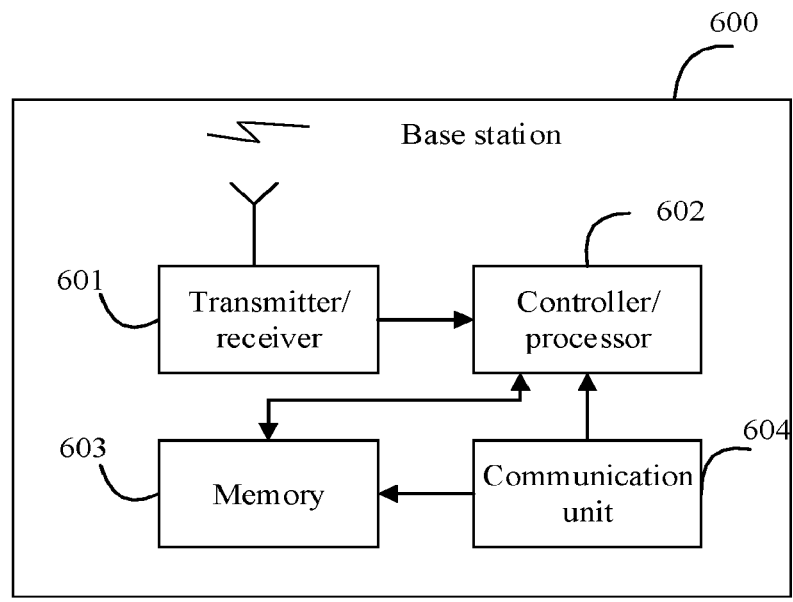
FIG. 6 illustrates a schematic structural diagram of a base station according to an exemplary embodiment.

FIG. 6 illustrates a schematic structural diagram of a base station according to an exemplary embodiment. A base station 600 includes a transmitter/receiver 601 and a processor 602. The processor 602 may also be a controller, which is represented as "controller/processor 602" in FIG. 6. The transmitter/receiver 601 is configured to provide a support for transmitting and receiving information between the base station and the terminal in the foregoing embodiment, and for the communication between the base station and other network entities. The processor 602 executes various functions for communicating with the terminal. In an uplink, an uplink signal from the terminal is received via an antenna, demodulated by the receiver 601, for example, demodulating a high-frequency signal into a baseband signal, and further processed by the processor 602 to be restored into service data and signaling information from the terminal. In a downlink, service data and signaling messages are processed by the processor 602, and modulated by the transmitter 601, for example, modulating a baseband signal into a high-frequency signal, to generate a downlink signal, which is transmitted to the terminal via an antenna. It should be noted that the above-mentioned demodulation or modulation function may also be implemented by the processor 602. For example, the processor 602 is further configured to perform the respective processes on the base station side in the above method embodiments, and/or other processes of the technical solutions described in the embodiments of the present disclosure.

Further, the base station 600 may further include a memory 603, which is configured to store at least one program code and data of the base station 600. In addition, the base station may also include a communication unit 604. The communication unit 604 is configured to provide a support for the communication between the base station and other network entities, for example, network devices in a core network and the like. For example, in a 5G NR system, the communication unit 604 may be an NG user plane interface (NG-U) configured to provide a support for the communication between the base station and a user plane function (UPF) entity; or, the communication unit 604 may also be an NG control plane interface (NG-C) configured to a support for accessing an access and mobility management function entity.

It can be understood that FIG. 6 only illustrates a simplified design of the base station 600. In practical applications, the base station 600 may include any number of emitters, receivers, processors, controllers, memories, communication units, or the like, and all the base stations that can practice the embodiments of the present disclosure shall be construed as falling within the protection scope of the embodiments of the present disclosure.

Figure 7:
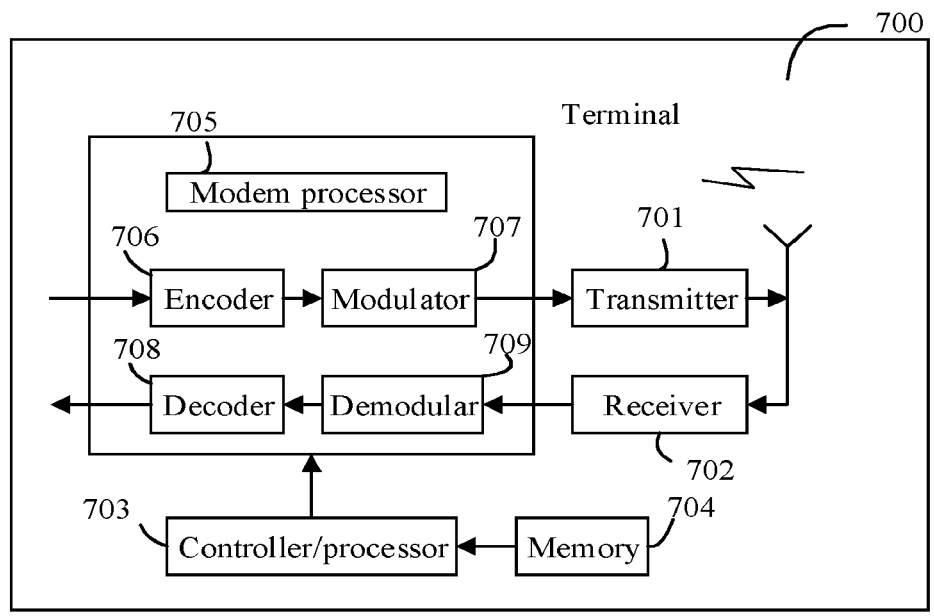
FIG. 7 illustrates a schematic structural diagram of a terminal according to an exemplary embodiment.

FIG. 7 illustrates a schematic structural diagram of a terminal according to an exemplary embodiment. The terminal 700 can include a transmitter 701, a receiver 702 and a processor 703. The processor 703 may also be a controller, which is represented as "controller/processor 703" in FIG. 7. Optionally, the terminal 700 may further include a modem processor 705, wherein the modem processor 705 may include an encoder 706, a modulator 707, a decoder 708, and a demodulator 709.

In some exemplary embodiments, the transmitter 701 adjusts, for example, by analog conversion, filtering, amplification, up-conversion, and the like, output sampling and generates an uplink signal which is transmitted to the base station via an antenna. In the downlink, the antenna receives a downlink signal from the base station. The receiver 702 adjusts, for example, by filtering, amplification, down-conversion, digitization, or the like, a signal received from the antenna and provides input sampling. In the modem processor 705, the encoder 706 receives service data and signaling messages to be transmitted on the uplink, and processes the service data and signaling messages, for example, by formatting, encoding, and interleaving. The modulator 707 further processes, for example, by symbol mapping and modulation, the encoded service data and signaling messages and provides output sampling. The demodulator 709 processes, for example, by demodulation, the input sampling and provides symbol estimation. The decoder 708 processes, for example, by de-interleaving and decoding, the symbol estimation and provides the decoded data and signaling messages to be transmitted to the terminal 700. The encoder 706, the modulator 707, the demodulator 709, and the decoder 708 may be implemented by an integrated modem processor 705. These units provide processing according to the wireless access technologies, for example, access technologies for 5G NR and other evolving systems, adopted by wireless access networks. It should be noted that, when the terminal 700 does not include the modem processor 705, the functions of the modem processor 705 may also be implemented by the processor 703.

The processor 703 controls and manages the actions of the terminal 700, and is configured to execute the processing procedures performed by the terminal 700 in the above embodiments of the present disclosure. For example, the processor 703 is further configured to execute each process on the terminal side in the above method embodiments, and/or other processes of the technical solutions described in the embodiments of the present disclosure.

Further, the terminal 700 may further include a memory 704 configured to store at least one program code and data for the terminal 700.

It can be understood that FIG. 7 only illustrates a simplified design of the terminal 700. In practical applications, the terminal 700 may include any number of transmitters, receivers, processors, modem processors, memories, or the like, and all the terminals that can practice the embodiments of the present disclosure shall be construed as falling within the protection scope of the embodiments of the present disclosure.

The embodiments of the present disclosure further provide a non-transitory computer-readable storage medium storing at least one computer program, wherein the at least one computer program, when executed by a processor, causes the processor to perform the method for channel detection on an unlicensed frequency spectrum.

It should be understood that the term "a plurality of" herein refers to two or more. The term "and/or" describes an association relation between associated objects and indicates three types of possible relations. For example, A and/or B may be expressed as the following three cases: A exists alone, A and B exist concurrently, and B exists alone. The symbol "/" generally indicates an "or" relation between contextually associated objects.

Other embodiments of the present disclosure are apparent to those skilled in the art from consideration of the specification and practice of the present disclosure. The present disclosure is intended to cover any variations, uses, or adaptations of the present disclosure following the general principles thereof, and include common knowledge or commonly used technical measures which are not disclosed herein. The specification and embodiments are to be considered as exemplary only, and the true scope and spirit of the present disclosure are as indicated by the appended claims.

It will be appreciated that the present disclosure is not limited to the exact construction that has been described above and illustrated in the accompanying drawings, and that various modifications and changes can be made without departing from the scope thereof. It is intended that the scope of the present disclosure is only subject to the appended claims.

What is claimed is:

1. A method for channel detection on an unlicensed frequency spectrum, applied to a base station, the method comprising:

determining a channel detection mechanism corresponding to a target beam among n beams based on information to be transmitted over a channel corresponding to the target beam, where n is an integer greater than 1, wherein in a case that the information to be transmitted is at least one of a synchronization signal block (SSB) or reference signal (RS), the channel detection mechanism corresponding to the target beam is a first mechanism in which no channel detection is performed, and in a case that the information to be transmitted is at least one of downlink control information (DCI) or downlink service data, the channel detection mechanism corresponding to the target beam is a second mechanism in which channel detection is performed based on a contention window, wherein the first mechanism is a mechanism that does not involve listen before talk (LBT), the second mechanism is a random back-off type LBT mechanism with a fixed contention window size (CWS);

detecting whether a channel corresponding to the target beam is idle based on the channel detection mechanism corresponding to the target beam;

determining a channel detection time requirement corresponding to the target beam, wherein the channel detection time requirement comprises a detection time duration;

detecting whether the channel corresponding to the target beam is idle in a time period that meets the channel detection time requirement based on the channel detection mechanism corresponding to the target beam;

determining a proportion of a hybrid automatic repeated request non-acknowledgment (HARQ-NACK) value corresponding to the target beam when determining that the channel detection mechanism corresponding to the target beam is an LBT Cat.4 mechanism, wherein the LBT Cat.4 mechanism is a mechanism with a variable CWS; and updating a CWS value corresponding to the target beam based on the proportion of the HARQ-NACK value corresponding to the target beam.

2. The method according to claim 1, further comprising:

determining a channel detection sequence corresponding to the n beams; and detecting whether channels corresponding to the n beams are idle one by one based on the channel detection sequence corresponding to the n beams, where a beam requiring channel detection among the n beams is the target beam.

3. The method according to claim 2, wherein determining the channel detection sequence corresponding to the n beams further comprises:

determining the channel detection sequence corresponding to the n beams based on a priority of information to be transmitted over a channel corresponding to each of the n beams.

4. The method according to claim 1, wherein a channel detection energy threshold corresponding to each of the n beams is independently determined.

5. A non-transitory computer-readable storage medium storing at least one computer program that, when run by a processor, causes the processor to perform a method for channel detection on an unlicensed frequency spectrum as defined in claim 1.

6. An apparatus for channel detection on an unlicensed frequency spectrum, comprising:

a processor; and a memory that is configured to store at least one instruction executable by the processor, wherein the processor, when executing the at least one instruction, is caused to perform operations comprising:

determining a channel detection mechanism corresponding to a target beam among n beams based on information to be transmitted over a channel corresponding to the target beam, wherein n is an integer greater than 1, wherein in a case that the information to be transmitted is at least one of a synchronization signal block (SSB) or reference signal (RS), the channel detection mechanism corresponding to the target beam is a first mechanism in which no channel detection is performed, and in a case that the information to be transmitted is at least one of downlink control information (DCI) or downlink service data, the channel detection mechanism corresponding to the target beam is a second mechanism in which channel detection is performed based on a contention window, wherein the first mechanism is a mechanism that does not involve listen before talk (LBT), the second mechanism is a random back-off type LBT mechanism with a fixed contention window size (CWS);

detecting whether a channel corresponding to the target beam is idle based on the channel detection mechanism corresponding to the target beam;

determining a channel detection time requirement corresponding to the target beam, wherein the channel detection time requirement comprises a detection time duration;

detecting whether the channel corresponding to the target beam is idle in a time period that meets the channel detection time requirement based on the channel detection mechanism corresponding to the target beam;

determining a proportion of a hybrid automatic repeated request non-acknowledgment (HARQ-NACK) value corresponding to the target beam when determining that the channel detection mechanism corresponding to the target beam is an LBT Cat.4 mechanism, wherein the LBT Cat.4 mechanism is a mechanism with a variable CWS; and updating a CWS value corresponding to the target beam based on the proportion of the HARQ-NACK value corresponding to the target beam.

7. The apparatus according to claim 6, wherein the processor performs operations further comprising:

determining a channel detection sequence corresponding to the n beams; and detecting whether channels corresponding to the n beams are idle one by one based on the channel detection sequence corresponding to the n beams, where a beam requiring channel detection among the n beams is the target beam.

8. The apparatus according to claim 7, wherein determining the channel detection sequence corresponding to the n beams further comprises:

determining the channel detection sequence corresponding to the n beams based on a priority of information to be transmitted over a channel corresponding to each of the n beams.

9. The apparatus according to claim 6, wherein the processor performs operations further comprising:
   determining a channel detection energy threshold corresponding to each of the n beams independently.

10. A method for channel detection on an unlicensed frequency spectrum, applied to a terminal, the method comprising:
   determining a channel detection mechanism corresponding to a target beam among n beams based on information to be transmitted over a channel corresponding to the target beam, where n is an integer greater than 1, wherein in a case that the information to be transmitted is a random-access request, the channel detection mechanism corresponding to the target beam is a first mechanism in which no channel detection is performed, and in a case that the information to be transmitted is at least one of uplink control information (UCI) or uplink service data, the channel detection mechanism corresponding to the target beam is a second mechanism in which channel detection is performed based on a contention window, wherein the first mechanism is a mechanism that does not involve listen before talk (LBT), the second mechanism is a random back-off type LBT mechanism with a fixed contention window size (CWS);
   detecting whether a channel corresponding to the target beam is idle based on the channel detection mechanism corresponding to the target beam;
   determining a channel detection time requirement corresponding to the target beam, wherein the channel detection time requirement includes a detection time duration;
   detecting whether the channel corresponding to the target beam is idle in a time period that meets the channel detection time requirement based on the channel detection mechanism corresponding to the target beam;
   determining a proportion of a hybrid automatic repeated request non-acknowledgment (HARQ-NACK) value corresponding to the target beam when determining that the channel detection mechanism corresponding to the target beam is an LBT Cat.4 mechanism, wherein the LBT Cat.4 mechanism is a mechanism with a variable CWS; and
   updating a CWS value corresponding to the target beam based on the proportion of the HARQ-NACK value corresponding to the target beam.

11. The method according to claim 10, further comprising:
   determining a channel detection sequence corresponding to the n beams; and
   detecting whether channels corresponding to the n beams are idle one by one based on the channel detection sequence corresponding to the n beams, where a beam requiring channel detection among the n beams is the target beam.

12. The method according to claim 11, wherein determining the channel detection sequence corresponding to the n beams further comprises:
   determining the channel detection sequence corresponding to the n beams based on a priority of information to be transmitted over a channel corresponding to each of the n beams.

13. The method according to claim 10, wherein a channel detection energy threshold corresponding to each of the n beams is independently determined.

14. The method according to claim 10, wherein the method further comprises:
   receiving channel detection indication information from a base station that indicates whether the channel corresponding to the target beam is idle; and
   determining the target beam requiring channel detection based on the channel detection indication information.

15. The method according to claim 10, wherein the method further comprises:
   determining a receive beam recently used for receiving information as the target beam for channel detection.

16. The method according to claim 10, wherein the method further comprises:
   determining a transmit beam recently used for transmitting information as the target beam for channel detection.

* * * * *